United States Patent
Päärt et al.

[11] Patent Number: 5,885,412
[45] Date of Patent: Mar. 23, 1999

[54] INHIBITION OF HYDROGEN PEROXIDE DECOMPOSING ENZYMES DURING BLEACHING OF CELLULOSE FIBERS

[75] Inventors: Enn Päärt, Partille; Kjell Abrahamsson, Göteborg; Peter Wållberg, Lerum, all of Sweden

[73] Assignee: Bim Kemi AB, Stenkullen, Sweden

[21] Appl. No.: 500,934

[22] PCT Filed: Dec. 22, 1994

[86] PCT No.: PCT/SE94/01245

§ 371 Date: Aug. 8, 1995

§ 102(e) Date: Aug. 8, 1995

[87] PCT Pub. No.: WO95/17546

PCT Pub. Date: Jun. 29, 1995

[30]    Foreign Application Priority Data

Dec. 23, 1993 [SE] Sweden .................................. 9304277

[51] Int. Cl.⁶ .............................. D21C 9/16; D21H 11/20
[52] U.S. Cl. .................................. 162/5; 162/6; 162/72; 162/78
[58] Field of Search ................................ 162/72, 76, 78, 162/6.5, 74; 435/277, 278; 8/111; 252/79.1, 102

[56]    References Cited

U.S. PATENT DOCUMENTS

| | | | |
|---|---|---|---|
| 2,838,459 | 6/1958 | Spout, Jr. ...................................... | 162/78 |
| 3,193,445 | 7/1965 | Parker et al. .............................. | 162/76 |
| 3,606,990 | 9/1971 | Gobert ........................................ | 8/111 |
| 3,751,222 | 8/1973 | Gobert ........................................ | 8/111 |
| 3,817,828 | 6/1974 | Bendiner ................................. | 162/161 |
| 4,752,354 | 6/1988 | Beurich et al. ........................... | 162/78 |
| 4,871,423 | 10/1989 | Grimsley et al. ......................... | 162/72 |

FOREIGN PATENT DOCUMENTS

| | | |
|---|---|---|
| 2129117 | 8/1993 | Canada . |
| 0 562 835 | 9/1993 | European Pat. Off. . |
| 796281 | 1/1981 | U.S.S.R. . |
| 846 079 | 8/1960 | United Kingdom . |
| 2 269 191 | 2/1994 | United Kingdom . |
| WO 88/03190 | 5/1988 | WIPO . |
| WO 88/06202 | 8/1988 | WIPO . |
| WO 92/20857 | 11/1992 | WIPO . |
| WO 94/29510 | 12/1994 | WIPO . |

OTHER PUBLICATIONS

Kjell Agner, "Verdoperoxidase", *Advances in Enzymology*, vol. No. 3, 1943, pp. 137–148.

Primary Examiner—Steven Alvo
Attorney, Agent, or Firm—Young & Thompson

[57]    ABSTRACT

A method and composition for suppressing or inhibiting the decomposing action of enzymes on hydrogen peroxide, e.g. peroxidase and catalase, during bleaching of cellulose fibres with hydrogen peroxide, especially in connection with the production of recycled paper, in such a way that microorganisms are not markedly affected, and discharges that are dangerous to the environment are minimized. The composition contains hydroxylamine, thiocyanate salts, formic acid, ascorbic acid or nitrites.

9 Claims, 7 Drawing Sheets

INHIBITION OF HYDROGEN PEROXIDE DECOMPOSING ENZYMES DURING BLEACHING OF CELLULOSE FIBERS

FIELD OF THE INVENTION

The present invention relates to the use of substances that inhibit or degrade enzymes when bleaching fibres of cellulose with hydrogen peroxide, a method for treating and bleaching cellulose pulp and a composition containing the substances.

BACKGROUND OF THE INVENTION

A criterion of paper quality is that it has high brightness and consequently is made from a sufficiently bleached pulp.

Different methods are known for bleaching of cellulose pulp such as addition of chlorine, hypochlorite, oxygen, ozone or hydrogen peroxide. These methods are generally combined in a bleaching process. Lately, environmental problems have attracted more attention and attempts have therefore been made to avoid bleaching with chlorine containing compounds since these, even in small quantities, are considered dangerous to the environment, despite a satisfactory bleaching with these chemicals. Oxygen containing compounds such as hydrogen peroxide, oxygen and ozone have therefore found increased use for bleaching of pulp. These compounds are decomposed to oxygen or substances that are environmentally acceptable. Hydrogen peroxide is preferred over ozone for economic and environmental reasons.

Bacteria are often present when cellulose pulp is bleached, especially when recycled paper is used. The bacteria produce enzymes like peroxidases and catalase that decompose hydrogen peroxide.

Attempts have been made to overcome the degrading action of the enzymes, especially catalase, by overdosing hydrogen peroxide, sometimes 6–8 times the normal dosage. Overdosing the hydrogen peroxide leads to a high dosage of sodium hydroxide and sodium silicate, and accordingly to increased costs.

Inhibition of catalase can also be accomplished by raising the temperature to 60°–90° C. or the pH to 10–14. However, a temperature rise may lead to a faster decomposition of the hydrogen peroxide and increased pH leads to yellowing of the pulp and consequently a need for more intense bleaching or a degradation of the pulp.

It has also been suggested that biocides could be added to kill the microorganisms and prevent the formation of catalase. Biocides are dangerous to the health and unsuitable from an environmental point of view. Moreover, when the microorganisms die, more catalase can come out into the process water.

Metal ions that are present, for example iron, manganese, copper and aluminum ions decompose hydrogen peroxide. To prevent this, complexing agents and sodium silicate are used today. Silicates are inclined to form deposits and the complexing agents are expensive and sometimes dangerous to use. Their influence on the environment is strongly questioned and not completely investigated.

From EP 0 562 835, it is known that small amounts of chlorine dioxide, bromine, chlorine, iodine and ozone can be used as oxidizing, enzyme inhibiting and germicidal agents when bleaching cellulose pulp with hydrogen peroxide. According to example 3 in the description, microorganisms in white water are killed with chlorine dioxide. Chlorine dioxide is a poisonous, explosive, corrosive and awkward substance that easily decomposes and has to be produced on site and kept in a dilute water solution. From an environmental point of view, these kinds of additives are also highly questioned.

U.S. Pat. No. 3,817,828 describes a method in which anionic surface active agents are combined with bactericadal substances, e.g. chlorine dioxide, hypochlorite or chlorine water to prevent bacterial growth. The used chlorine compounds are poisonous and dangerous to the environment, and although the method is declared to decrease the use of these, some chlorine compounds will be released to the environment.

G. Galland, E. Bernard, Y. Verac suggest in "Achieving a deinked pulp with high brightness" in Paper Technology, December 1989 different ways to increase the brightness when processing recycled paper by decreasing the hydrogen peroxide consumption. For instance, it is suggested that catalase are removed by eliminating the microorganisms that produce the enzyme or by destroying catalase before bleaching. A sodium hypochlorite treatment may be used to destroy catalase. However, sodium hypochlorite is a substance that is unsuitable for environmental reasons.

In principle the methods given in the two publications involve the use of bleaching agents that are harmful to the environment and are avoided nowadays, in small amounts in order to kill the microorganisms and deactivate the enzyme.

Additions of substances that affect the bleaching with hydrogen peroxide have been suggested. U.S. Pat. No. 3,193,445 describes a method in which the addition of 0.5 to 2.5 moles of acetic anhydride per mole remaining hydrogen peroxide is added in the end of the bleaching process in order to activate the remaining peroxide. Accordingly, the bleaching process of the pulp is prolonged. Derwent's abstract of SU 796 281 describes a method where 0.1–1 (w/w %) oxalate (calculated on dry pulp basis) is added together with hydrogen peroxide under alkaline conditions at 60°–70° C.

However, none of these references mention anything about the possibility to intensify the action of hydrogen peroxide by inhibiting hydrogen peroxide decomposing enzymes like peroxidases and catalases.

SUMMARY OF THE INVENTION

According to the present invention, the use of one or more substances is suggested, that suppress or inhibit the degrading effect of enzymes, such as peroxidases and catalases, decomposing hydrogen peroxide during bleaching of cellulose fibres with hydrogen peroxide, and which substances do not affect microorganisms.

Preferred substances are those that are not harmful to the environment and therefore can be handled without special considerations when used in the bleaching process and then let out into the sewer without affecting a possible following biological purifying plant, before the water is released to the environment. Substances which are not or will not form halogen containing compounds that are dangerous to the environment are preferred. These substances do not affect modern biocide free slime control methods (Biochem®, Bimogard®) that are used to an increasing extent in the cellulose- and pulp industry. In contrast to biocides, they are expected to have an advantageous effect on this kind of process.

Hydrogen peroxide can enter the cells of microorganisms and be degraded internally by peroxide decomposing enzymes, especially catalase. The decomposition also takes place outside the cells because such enzymes are secreted.

The amount of catalase is increased if the cells are killed and disrupted. Therefore, it is, assumed that the optimal inhibition of the decomposing effect of catalase occurs when the catalase outside the cells is deactivated without killing and disrupting the microorganisms.

GB-A-2 269 191 that was published after the priority date of the present application, deals with a method of bleaching with hydrogen peroxide, where an organic peracid is added as a biocide to kill and prevent growth of catalase producing microorganisms. It is incidentally stated that it is known that catalase inhibitors like hydroxylamine are used in connection with pulp bleaching using hydrogen peroxide. However, no references to known techniques are given, and the document does not account for experiments where catalase is inhibited. In safety data sheets from manufacturers (Raschig, BASF) of hydroxylamine and hydroxylamine salts, it is announced that hydroxylamine is decomposed in aqueous solution if hydrogen peroxide is present. Moreover, a warning is issued against the use of hydroxylamine salts in the presence of oxidizing agents (e.g. hydrogen peroxide) under alkaline conditions. Therefore, the mention of hydroxylamine and catalase inhibitors has to be regarded as pure speculation. Consequently, the use of hydroxylamine and catalase inhibitors in connection with bleaching of pulp with hydrogen peroxide cannot be regarded as known in the art.

It is assumed, without limiting the invention to this theory, that the inhibiting effect of the substances arises from blocking or destroying the active sites on the enzyme molecule. The active site of catalase contains iron or manganese ions that can be blocked or deactivated by complex formation. The substances can also inhibit other enzymes than catalase, e.g. peroxidases.

The following substances can be used according to the invention:

Hydroxylamine and alkyl derivatives having 1–10 carbon atoms in a straight or branched chain such as, for example, methylhydroxylamine, and their salts and addition salts such as hydroxylammonium sulfate and -chloride; thiocyanates such as ammonium thiocyanate; formic acid, ascorbic acid, salicylic acid, nitrites such as sodium nitrite, potassium nitrite, calcium nitrite and magnesium nitrite. These substances can also be mixed. As mentioned earlier, halogen containing substances that are dangerous to the environment are avoided. Certain halogen salts may however be environmentally harmless at the used concentrations.

Preferably the following substances are used; hydroxylamine and its salts and addition salts, e.g. hydroxylammonium sulfate and—chloride; ascorbic acid and mixtures of these substances, most preferably hydroxylammonium sulfate.

The enzyme inhibitors according to the invention can be used for bleaching all kinds of cellulose pulps, especially pulp made from recyclable paper, but also pulps from sulfite or sulfate cooking, mechanical pulp, thermomechanical pulp and chemothermomechanical pulp. As the catalase inhibiting substances according to the invention do not affect the microorganisms, they can also be suitable for bleaching with hydrogen peroxide of pulps that have been produced by microbiological lignin degradation.

The invention also comprises an enzyme inhibiting composition that is characterized by containing at least one catalase inhibiting substance according to the invention. These compositions can consist of the catalase inhibiting substance per se, or mixtures containing the substance in a solid or liquid form or a solution or suspension of the substance (substances). As solvent or suspending agent, water or an organic solvent may be used that is consistent with the intended purpose and does not affect the bleaching or the treatment of the cellulose pulp in a negative way. The composition can contain 0.1–100% (w/w) of the catalase inhibiting substance, particularly 1–50%, especially 5–20%, and most preferably 10%. Water solutions are preferred.

The composition according to the invention can also contain 0.001 to 10% (w/w) of one or more complexing agents to deactivate possible metal ions in the process, and 0.001 to 10% (w/w) of surface active agents or detergents to enhance the distribution of the inhibitor in the pulp.

Suitable complexing agents include e.g. phosphonic acids, aminopolycarbonic acids like EDTA, EGTA and DTPA and various acids like gluconic acid, tartaric acid and citric acid.

Suitable detergents can be anionic, cationic, nonionic or amphoteric, and include the following:
1: Salts of carboxylic acids of the type RCOOM where R is a carbon chain having 9–21 carbon atoms and M is an alkali metal.
2: Quaternary ammonium salts
3: Alcohol ethoxylates
4: Alkylbetaines The components of the composition have, as mentioned earlier, low toxicity for microorganisms. Table 1 shows $EC_{20}$-data for standard chemicals used in the pulp and paper industry together with components of the inhibiting composition.

The invention also includes a method for treatment and hydrogen peroxide bleaching of cellulose, where at least one substance according to the invention is added.

The enzyme inhibiting substance or composition according to the invention can be added anywhere in the pulp bleaching process. Consequently, it is possible to add the composition or the substances anywhere in the treatment of the cellulose pulp such as at the production of the pulp itself before the bleaching step.

The invention especially comprises a method for bleaching recycled paper, where paper, water, chemicals, such as alkali silicates, surface active agents, such as tensides, and possibly complexing agents are suspended. The suspension is purified and dewatered, the pulp is bleached with hydrogen peroxide and deinked by flotation or washing, possibly also with cyclones, vortex cleaners, screening and filtering, which method is characterized by the addition of at least one catalase inhibitor before bleaching, and optionally to the white water coming from the various process stages and preferably by the presence of hydrogen peroxide in the flotation stage.

The hydrogen peroxide and/or the inhibitor are preferably added at one or more of the following stages in the process: the mixing screw before the bleaching tower, at the flotation, at the pulper, in the incoming white water from the press and in the white water tanks. Most preferably, hydrogen peroxide is added in the pulper and/or the bleaching tower. It is especially preferred to add the catalase- or peroxidase inhibitor at the suction side of the pumps; in the white water system, directly into the white water tanks, in the water from the paper machines and in the purified water from the micro flotation.

White water in this context means a separated liquid that is recirculated to a preceding stage, especially to the first disintegration stage, where paper, water and chemicals are mixed.

Bleaching with hydrogen peroxide is usually carried out at pH greater than 7 and the pH is generally more than 5, preferably over 8, for example between 7 and 12, most preferably between 8 and 11.5.

The necessary amount of inhibitor can be determined by someone skilled in the art after determination of the remaining hydrogen peroxide in the process water and pulp and with regard to the brightness of the pulp. The brightness depends on the pH, temperature, to what extent the process water is recirculated and the used pulp, especially when recycled paper is used, because the pulp can contain varying amounts of microorganisms depending on the conditions under which it is stored. The added amount of enzyme inhibiting substance is generally 0.001–1.5% (w/w), calculated on dry pulp basis, preferably 0.01–0.5%, most preferably 0.01–0.05%. Sometimes considerably larger amounts may be needed.

Alternatively, the addition can be done with 0.5–110% (w/w), preferably 5–50% enzyme inhibiting substance calculated on added hydrogen peroxide basis. The larger amounts are added when the hydrogen peroxide concentration has decreased.

BRIEF DESCRIPTION OF THE DRAWINGS

The invention will now be described in detail with reference to the enclosed figures, wherein.

DETAILED DESCRIPTION OF THE INVENTION

Figure 1:
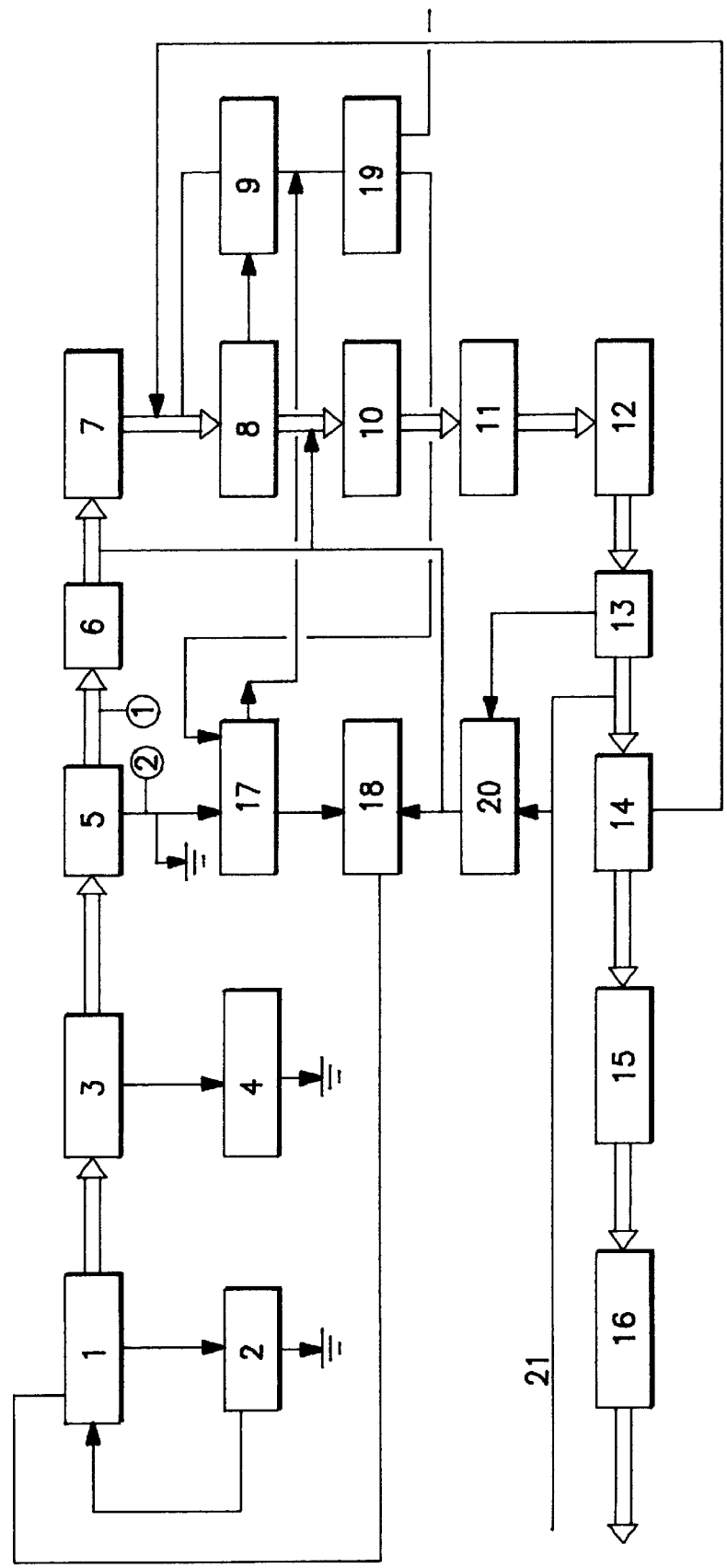
FIG. 1 shows a block diagram of a bleaching process using recycled paper.

FIG. 1 shows a block diagram of a bleaching process using recycled paper. In a pulper 1 recycled paper, water, sodium hydroxide, hydrogen peroxide and a collector (Raisapon, dispersion of fatty acids) are added. The fibre suspension is cleaned and dewatered through the coarse screener 2, turbo separator 3, and reject screening cyclones 4. After the belt press 5, complexing agents (e.g. a magnesium complex with DTPA) together with hydrogen peroxide and sodium hydroxide are added and the pulp is sent to the bleaching tower 6 by means of mixing screw (not shown), cleaned in sand vortex cleaners 7, flotated in the primary and secondary flotation cells 8 and 9, and passed through vortex cleaners 10 and 12, fine screening 11, disc filters 13, screw presses 14, kneaders (Frota pulpers) 15, and finally, it is sent to storage tower 16 before the paper machine.

A part of the separated water from the belt presses 5 goes to the micro flotation unit 17 and forms white water I that is returned to pulper 1 via white water tank 18. Separated material from the micro flotation unit 17 goes to the centrifuge 19 after the secondary flotation unit 9, and the liquid from centrifuge 19 is returned to the microflotation unit 17.

Liquid from disc filters 13 goes to white water tank 20, where also drainage water from the press section 21 in the paper machine is added. From the white water tank 20, white water II is brought to white water tank 18 and further to pulper 1.

Figure 2:
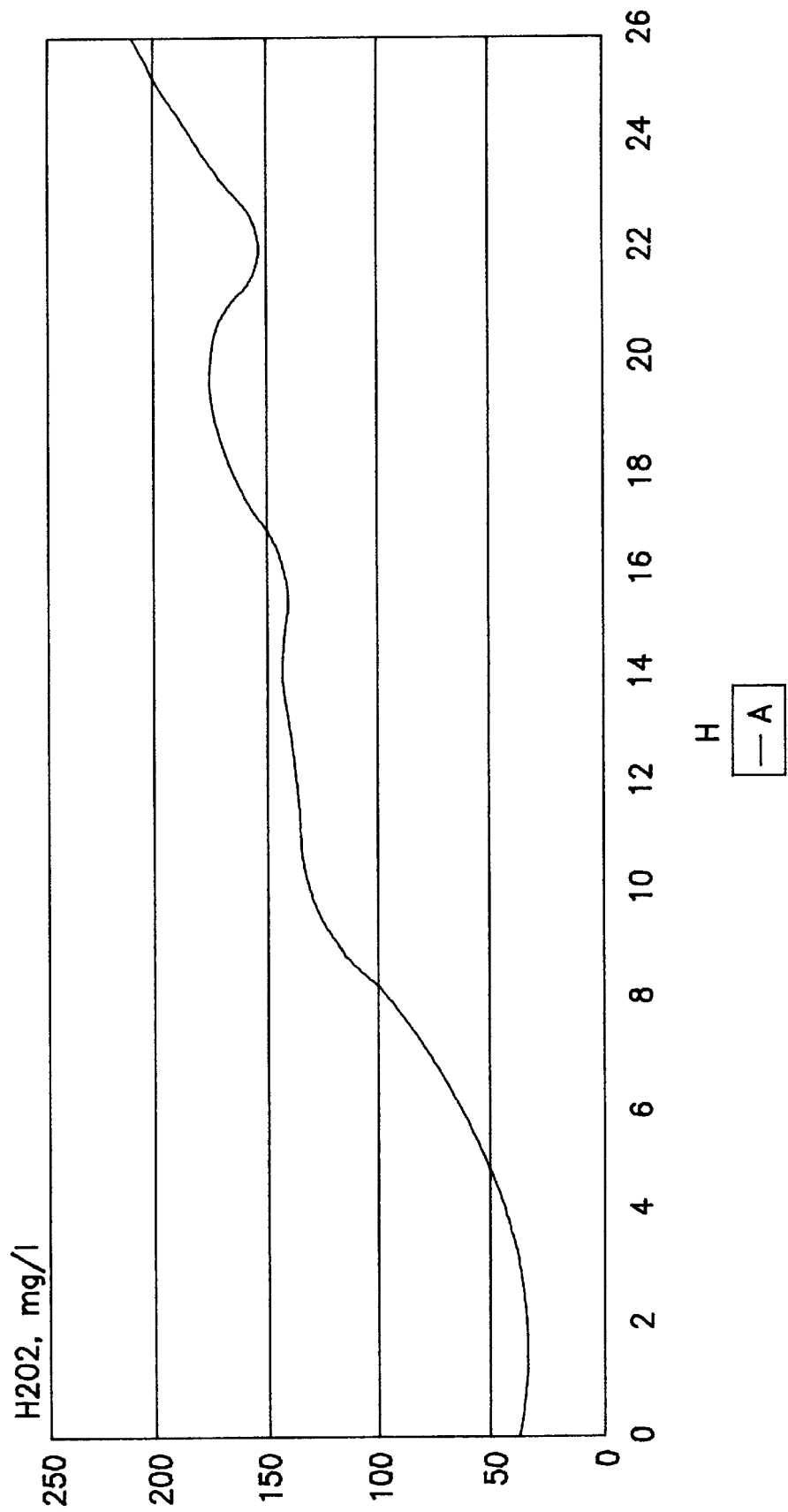
FIG. 2 is a graphical representation of hydrogen peroxide concentration vs. time at the outlet of the bleaching tower during a trial.

FIG. 2 shows the result of the trial according to example 1. The hydrogen peroxide concentration in the furnish from bleaching tower 6 is shown versus time. The addition of the inhibitor started at time 0.

Figure 3:
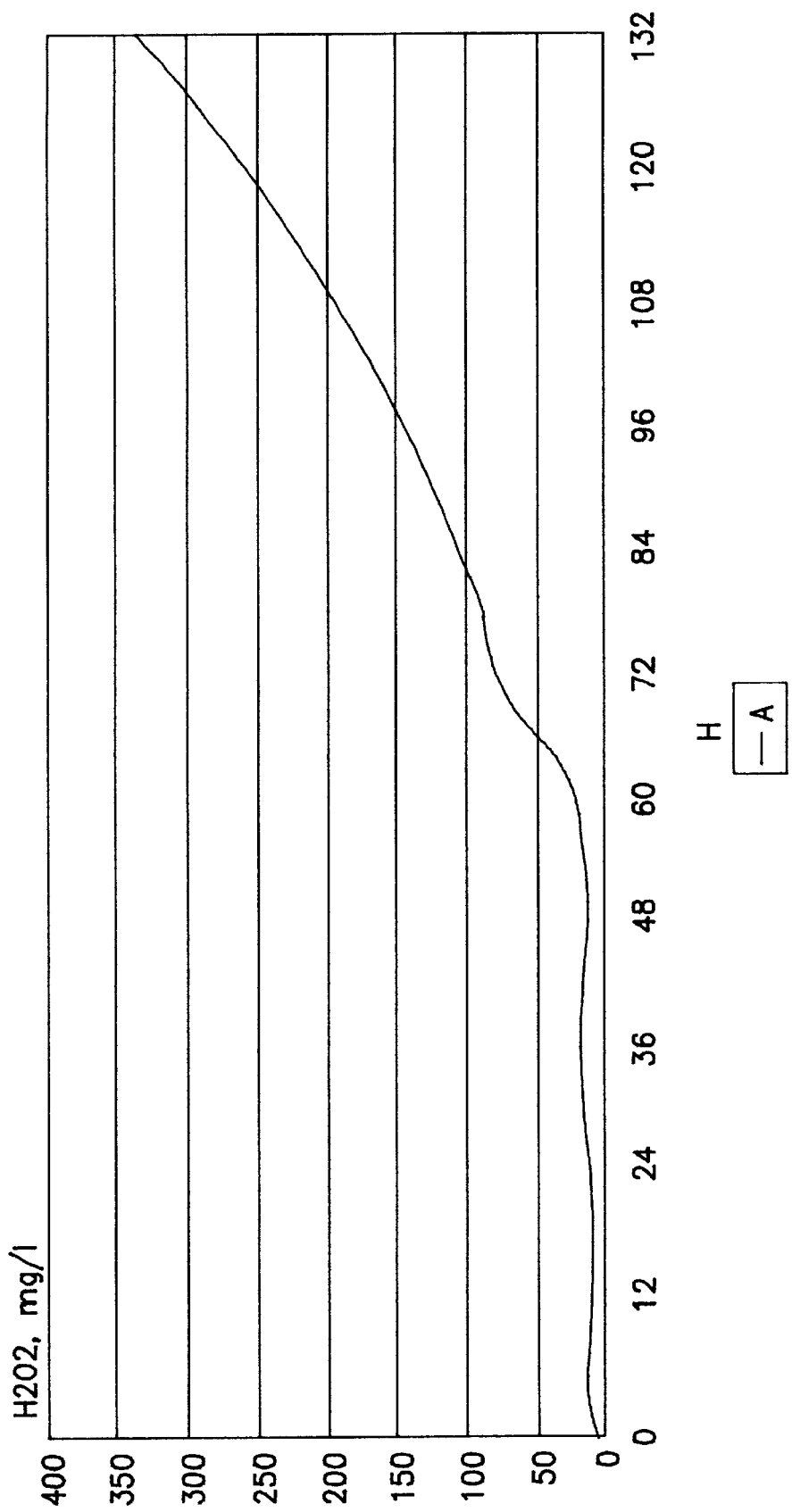
FIG. 3 is a graphical representation of how the concentration of hydrogen peroxide varies during the trial.

FIG. 3 shows the result from the trial in example 2. The hydrogen peroxide concentration in the process water from white water tank 18 is given vs time. The inhibiting substance was added solely in the water from the presses 21 during the first 55 hours. After that, the addition was done both in press water 21 and white water I between the microflotation 17 and white water tank 18.

Figure 4:
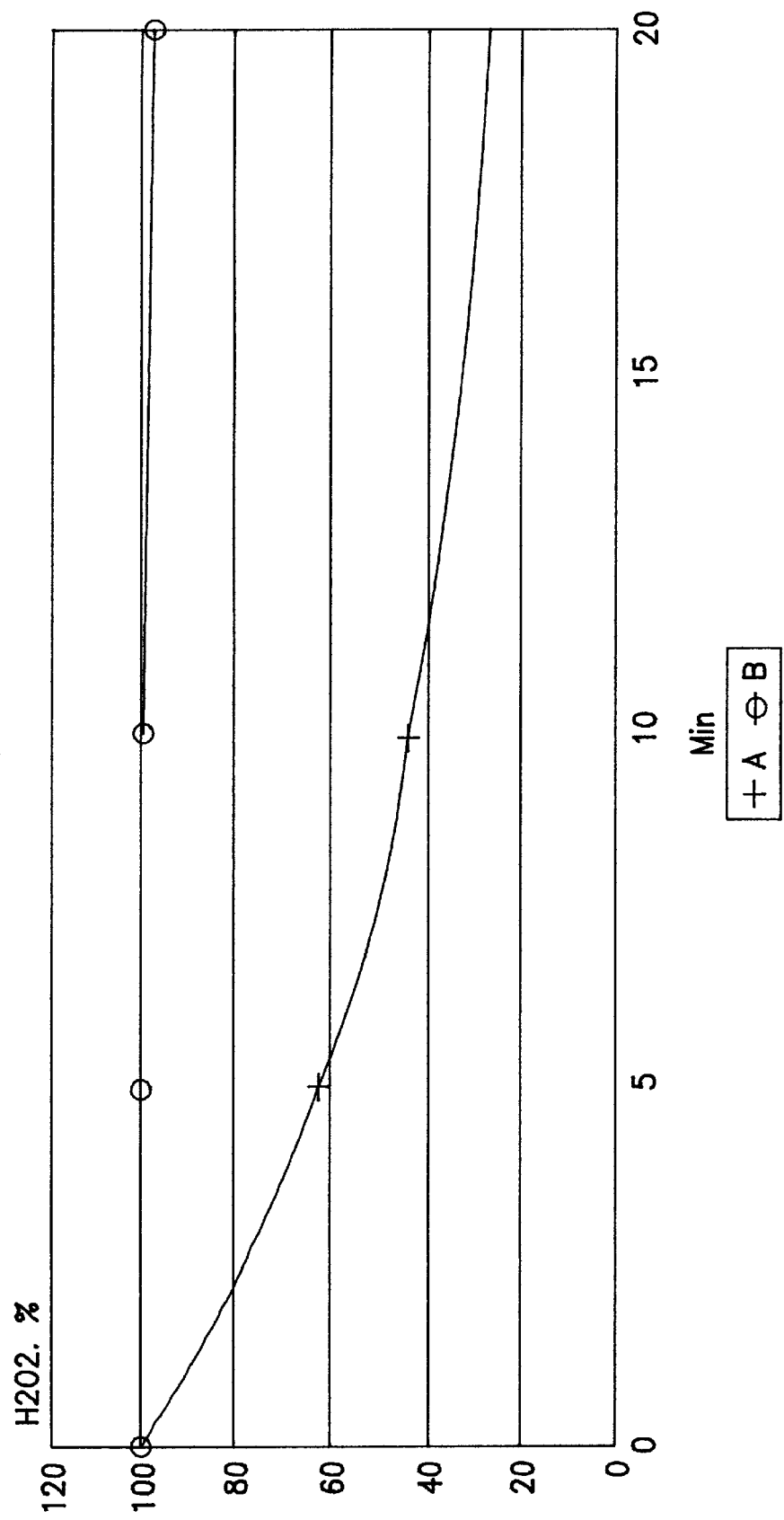
FIG. 4 shows the decomposition of the hydrogen peroxide at the beginning of the trial (graph A) and at the end (graph B)

FIG. 4 shows the decomposition of the hydrogen peroxide in the white water at the start of the trial (graph A) and the end of the trial according to example 2. (graph B)

Figure 5:
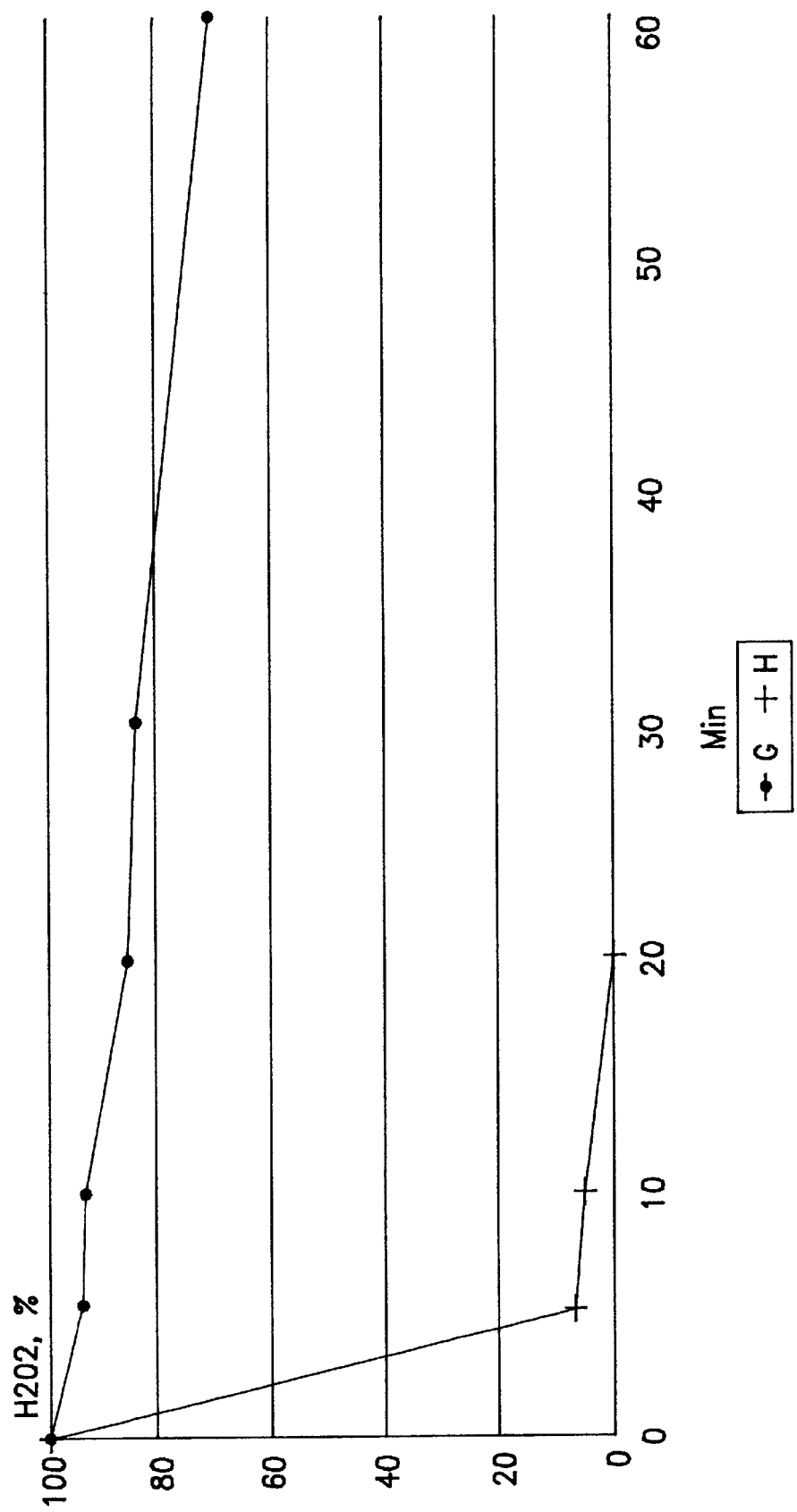
FIG. 5 shows the percentage of remaining hydrogen peroxide as a function of time after the addition of hydroxyl ammonium chloride.

FIG. 5 shows decomposition of added hydrogen peroxide when testing catalase containing water from the micro flotation 17 in FIG. 1 at normal operation without inhibitor (graph H) and with addition of 1 mmol/l (graph G) hydroxylammonium chloride.

Figure 6:
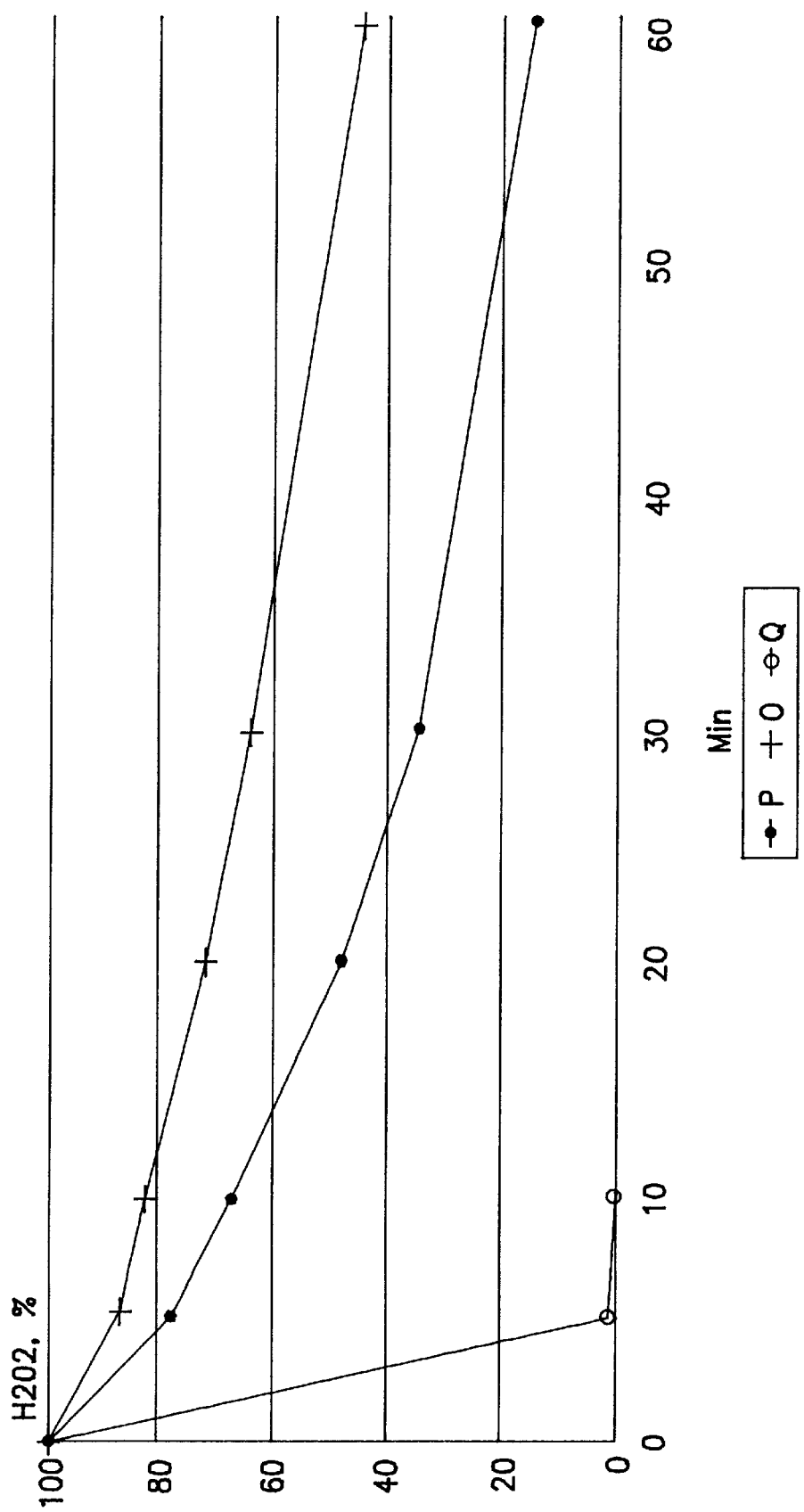
FIG. 6 shows the remaining hydrogen peroxide when two inhibitors were added (graph P), only hydroxylammonium chloride (graph O), and without inhibitor (graph Q)

FIG. 6 shows graphs similar to FIG. 4 but without addition of inhibitor (graph Q), 1 mmol/l hydroxylammonium chloride (graph O) and 0.5 mmol/l each of hydroxylammonium chloride and ascorbic acid (graph P).

Figure 7:
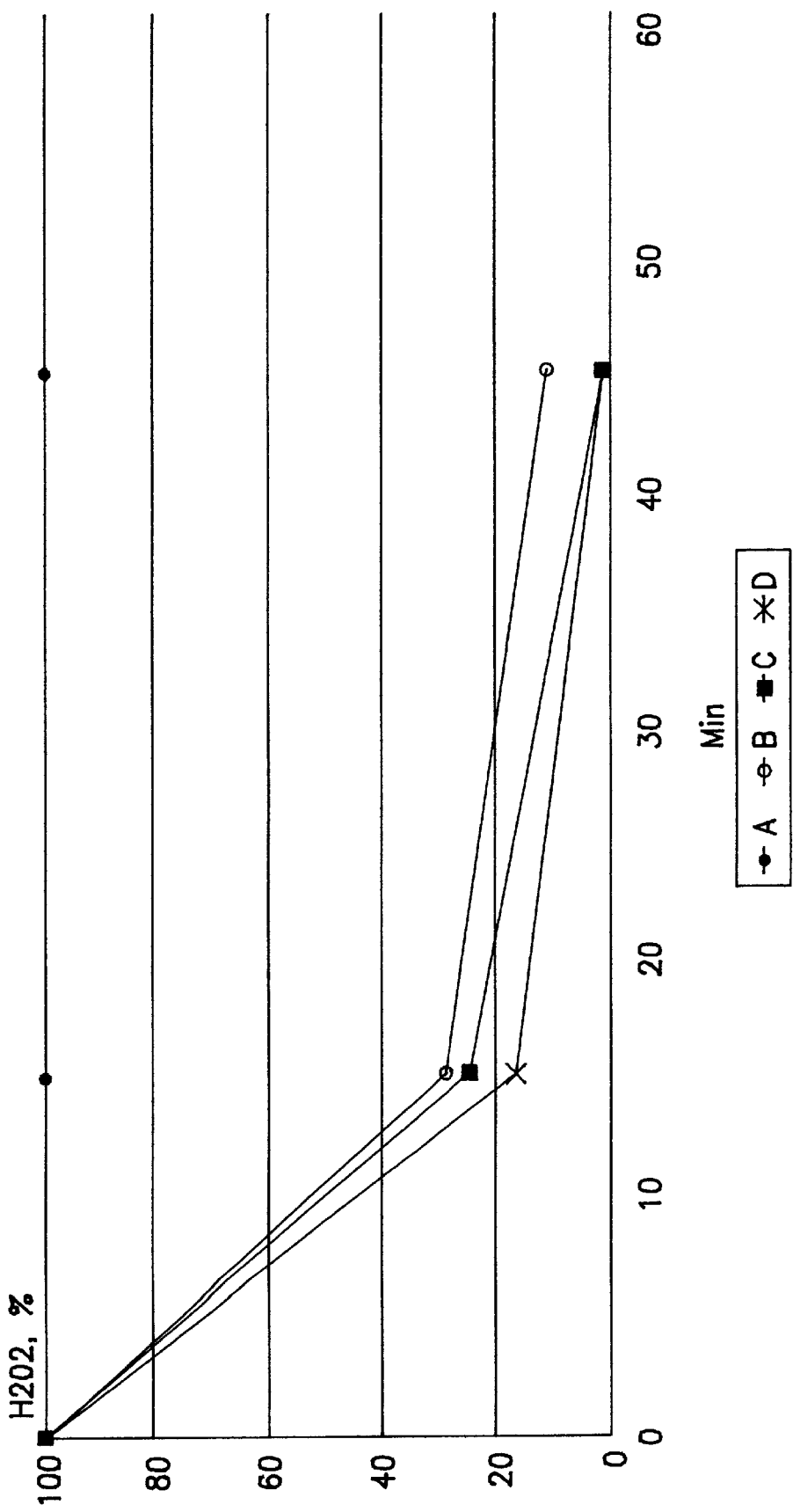
FIG. 7 shows the remaining hydrogen peroxide in % after addition of hydroxylammonium sulfate (graph A), ammonium thiocyanate (graph B), and formic acid (graph C).

FIG. 7 shows the inhibiting effect of hydroxylammonium sulfate (graph A), ammonium thiocyanate (graph B) and formic acid (graph C compared to iodine (graph D) and with catalase solution prepared in the laboratory in the presence of hydrogen peroxide.

Practical examples are given below to illustrate the invention without thereby restricting its scope. The given weights are based on dry pulp.

EXAMPLE 1

Trial with hydroxylammonium sulfate as inhibitor in a plant for treatment of recycled paper Hydroxylammonium sulfate has been tested as a catalase inhibitor in a plant for treatment of recycled paper. FIG. 1 schematically shows how the recycled paper is treated in the plant.

In a plant according to FIG. 1, a trial was run for 26 hours with addition of hydroxylammonium sulfate as a 10% (w/w) solution. The inhibitor solution was added before bleaching tower 6 into a mixer (not shown) and in the microflotation. The first dosage point was chosen because the pulp before the mixer, in this system, has a low water content which gives a high concentration of inhibitor in the pulp before adding the hydrogen peroxide in the bleaching tower 6. The amount of added inhibitor was 1.9 kg/ton dry pulp at each dosing point during the whole trial.

In the beginning of the trial, the added hydrogen peroxide was 15 kg (50% (w/w))/ton dry pulp (5 kg/ton in the pulper and 10 kg/ton in the mixing screw before the bleaching tower 6).

The concentration of hydrogen peroxide was determined by the method described by Vogel, Artur I.: Vogel's textbook of quantitative chemical analysis, 5th edition, page 394.

FIG. 2 shows the concentration of hydrogen peroxide in mg/l in the outlet from the bleaching tower 6 during the trial.

The trial was run so that the brightness levels was the same as usual.

EXAMPLE 2

Another experiment was carried out in the plant described in FIG. 1

The experiment lasted 132 hours and 14 kg hydrogen peroxide (50% (w/w)) per ton dry pulp was added. A water solution of hydroxylammonium sulfate (10%(w/w)) was first added solely to the white water coming from the paper machine 21. The added amount was 1.4 kg per ton dry pulp. This, however, gave a low hydrogen peroxide concentration. After 55 hours the addition was increased to 1.4 kg/ton in the white water and 1.7 kg/ton to the microflotation. This resulted in a strong increase in the hydrogen peroxide concentration in the white water and consequently, it was; possible to decrease the addition of hydrogen peroxide with this inhibitor dosage.

FIG. 3 shows how the concentration of hydrogen peroxide varied during the trial

FIG. 4 shows the decomposition of the hydrogen peroxide at the beginning of the trial (graph A) and at the end (graph B).

EXAMPLE 3

Catalase inhibiting effects of hydroxylammonium chloride

In another experiment, hydroxylammonium chloride was added to a sample of process water from the micro flotation unit 17 in the plant according to FIG. 1, to the final concentration 1 mmol/l. The production was run without any inhibitor according to the invention and the addition of hydrogen peroxide was done in the same way as in example 1. FIG. 5 shows the percentage of remaining hydrogen peroxide as a function of time after the addition of hydroxylammonium chloride. Graph G shows the concentration of remaining hydrogen peroxide when hydroxylammonium chloride was added and graph H without any addition.

One hour after the addition of hydroxylammonium chloride, approximately 75% of the hydrogen peroxide remained.

EXAMPLE 4

Catalase inhibiting effect of hydroxylammonium chloride and ascorbic acid

To examine the combined effects of hydroxylammonium chloride and ascorbic acid, 0.05 mmol of each were added to catalase containing water from the screw presses, and in a second experiment hydroxylammonium chloride (1 mmol/l) only. FIG. 6 shows remaining hydrogen peroxide when two inhibitors were added (graph P), only hydroxylammonium chloride (graph O) and without inhibitor (graph

EXAMPLE 5

Analysis of the inhibition of catalase by formic acid, hydroxylammonium sulfate, ammonium thiocyanate and in a buffered solution of hydrogen peroxide (0.1 w/w %) at pH 7

The catalase inhibiting effect of some substances were examined in a buffered solution of hydrogen peroxide at pH 7.

A buffer solution was prepared by dissolving $KH_2PO_4$ and $Na_2HPO_4$ to a final concentration of 0.025M each. Five mg of catalase was dissolved in 100 ml of the buffer solution. The catalase was supplied by Sigma and had an activity of 2000 units per mg protein. One unit will decompose 1 μmole hydrogen peroxide per minute at pH 7 and 25° C., which leads to a fall in hydrogen peroxide concentration from 10.3 to 9.2 mM.

20 ml of the buffered catalase solution and 1 mmol inhibitor were mixed with 180 ml buffer solution and 2 ml 10% (w/w) hydrogen peroxide was added. Hydroxylammonium sulfate, ammonium thiocyanate and formic acid were tested.

Remaining hydrogen peroxide was determined in 50 ml samples after 5 and 15 minutes.

FIG. 7 shows remaining hydrogen peroxide in percent after addition of hydroxylammonium sulfate (graph A), ammonium thiocyanate (graph B) and formic acid (graph C).

It is evident that these inhibitors are more effective than iodine (graph D) according to EP 0 562 835.

TABLE 1

| Product | Concentration (%) | $EC_{20}$ (mg/l) | Dosage (mg/l) |
|---|---|---|---|
| Neutral size | 12 | 1780 | 100 |
| Defoamer | 30 | 104 | 1 |
| Resin size | 30 | 6.9 | 100 |
| Hydrogen peroxide | 35 | 24 | 100 |
| Peracetic acid | 11 | 0.49 | 100 |
| Glutaraldehyde | 50 | 2.6 | 100 |
| Hydroxylammonium sulfate | 10 | 550 | 150 |

These toxicity tests was made with a Microtox™-kit (Bio Orbit, Turku, Finland) according to the manufacturer's directions. A high $EC_{20}$-value means low toxicity.

We claim:

1. A method for bleaching cellulose pulp from recycled paper with hydrogen peroxide, which comprises adding a composition containing
   a) at least one of a complexing agent and a detergent, and
   b) at least an effective amount of a substance that will cause inhibition of hydrogen peroxide decomposing enzymes selected from peroxidases and catalases, said substance comprising:
      hydroxylamine and its alkyl derivatives having 1–10 carbon atoms in a straight or branched chain and salts thereof; said effective amount being insufficient to kill microorganisms which produce said hydrogen peroxide decomposing enzymes, and ranging from 0.001 to 0.5% w/w calculated on dry pulp; and
   c) bleaching said recycle paper with hydrogen peroxide.

2. A method according to claim 1, wherein the added amount of enzyme inhibiting substance is from 0.001 to 1.5% (w/w) calculated on dry pulp.

3. A method according to claim 2, wherein the added amount of enzyme inhibiting substance is from 0.01 to 0.5% (w/w) calculate on dry pulp.

4. A method according to claim 1, wherein from 0.5–110% (w/w) of enzyme inhibiting substance calculated on added hydrogen peroxide, is added.

5. A method according to claim 4, wherein from 5–50% of enzyme inhibiting substance, calculated on added hydrogen peroxide is added.

6. A method according to claim 5, wherein the enzyme inhibiting substance is added before the bleaching to process water recirculated for bleaching.

7. A method according to claim 1, wherein the cellulose pulp is produced and bleached and that the enzyme inhibiting substance is added anywhere during the pulp production or bleaching.

8. A method according to claim 1, wherein the enzyme inhibiting substance is added to enhance the flotation of impurities.

9. A method according to claim 1, wherein the composition contains hydroxylamine, hydroxylammonium sulfate, or hydroxylammonium chloride.

* * * * *